United States Patent
Mori et al.

(10) Patent No.: US 7,299,249 B2
(45) Date of Patent: Nov. 20, 2007

(54) APPARATUS, SYSTEM, AND PROGRAM FOR DETERMINING CONSISTENCY OF A DATABASE

(75) Inventors: Shigeko Mori, Kanagawa (JP); Ichiroh Teshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/462,646

(22) Filed: Aug. 4, 2006

(65) Prior Publication Data
US 2007/0043775 A1 Feb. 22, 2007

(30) Foreign Application Priority Data
Aug. 17, 2005 (JP) .............................. 2005-236552

(51) Int. Cl.
*G06F 17/30* (2006.01)
(52) U.S. Cl. ...................................................... 707/201
(58) Field of Classification Search ...................... None
See application file for complete search history.

(56) References Cited

FOREIGN PATENT DOCUMENTS

| JP | 08-249222 | 9/1996 |
|----|-----------|--------|
| JP | 2001-142765 | 5/2001 |

*Primary Examiner*—Apu Mofiz
*Assistant Examiner*—Kavita Padmanabhan
(74) *Attorney, Agent, or Firm*—Kunzler & McKenzie

(57) ABSTRACT

The invention efficiently determines consistency of a database by a system including a reading section that sequentially reads from the respective segment data included in the database pointers to other segment data, an address recording section that records storage addresses of segment data from which the pointers have been read by the reading section, and a pointer recording section that records the pointers read by the reading section. Then, when segment data is updated in an area in which the pointer reading has been completed, a storage address recorded in the address recording section is modified and a pointer recorded in the pointer recording section is modified. Then, it is determined that the database is consistent on condition that the respective storage addresses recorded in the address recording section coincide with the respective pointers recorded in the pointer recording section.

13 Claims, 16 Drawing Sheets

360

| STORAGE ADDRESS RECORDING AREA 400 | POINTER-BEFORE-MODIFICATION RECORDING AREA 410 | POINTER-AFTER-MODIFICATION RECORDING AREA 420 |
|---|---|---|
| ∫ | ∫ | ∫ |
| 1100 | 2000 | 1200 |
| 1200 | NULL | 2000 |
| ∫ | ∫ | ∫ |
| 3000 | 3100 | 3200 |
| 3100 | 3200 | NULL |
| ∫ | ∫ | ∫ |

FIG. 4

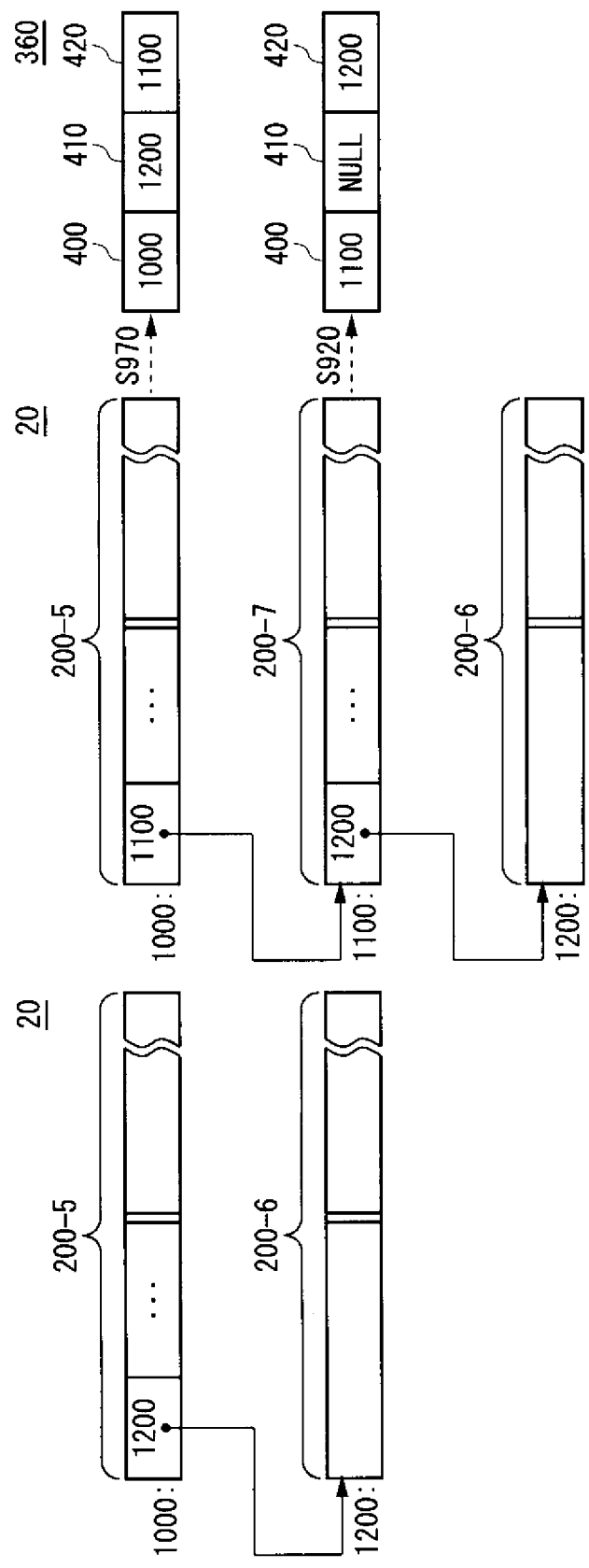

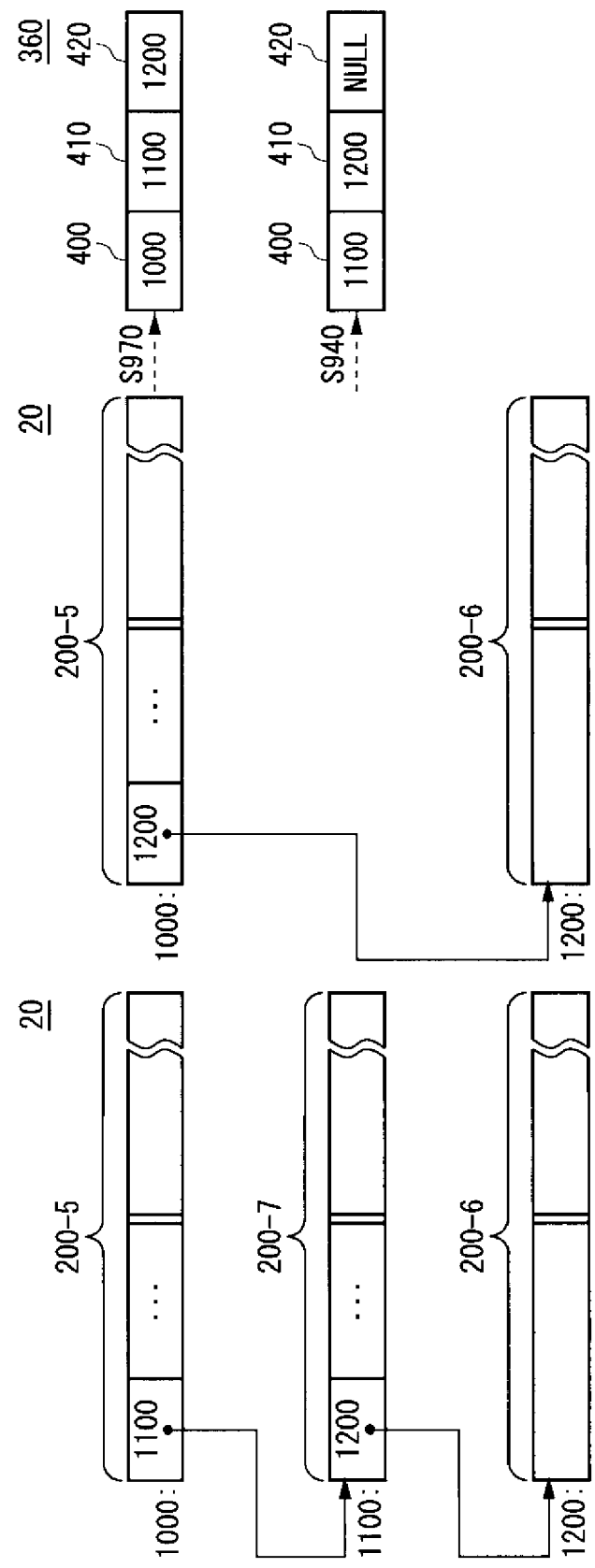

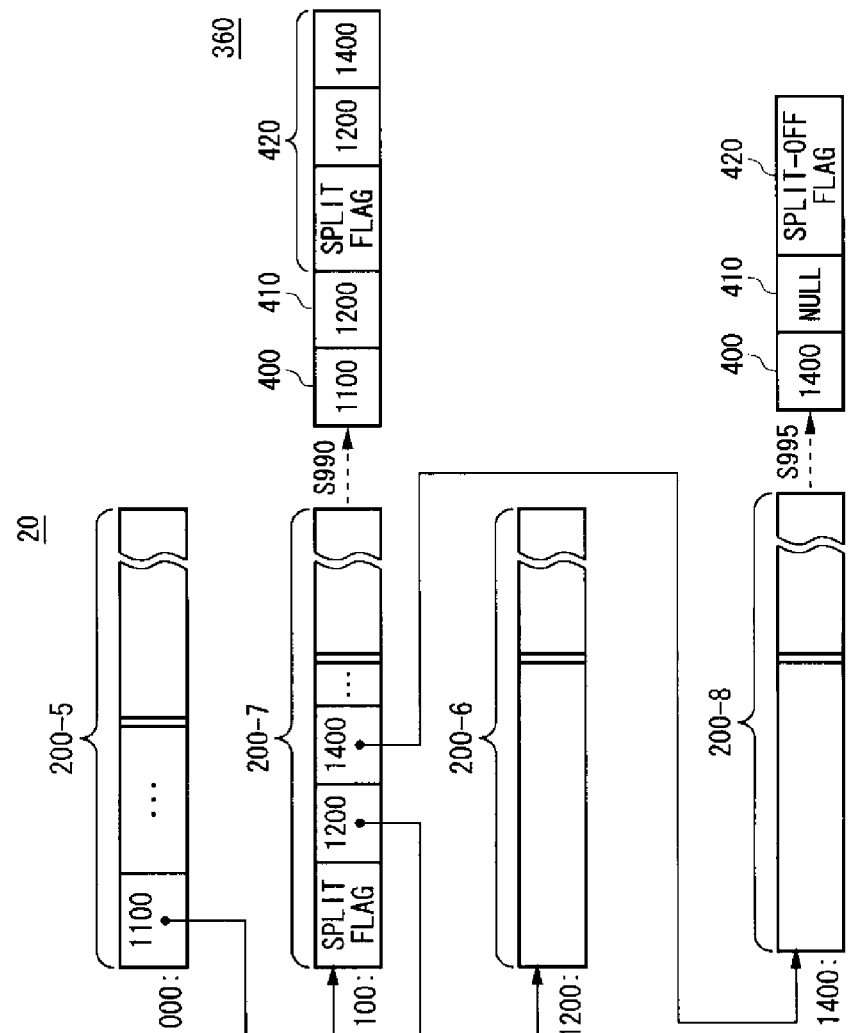
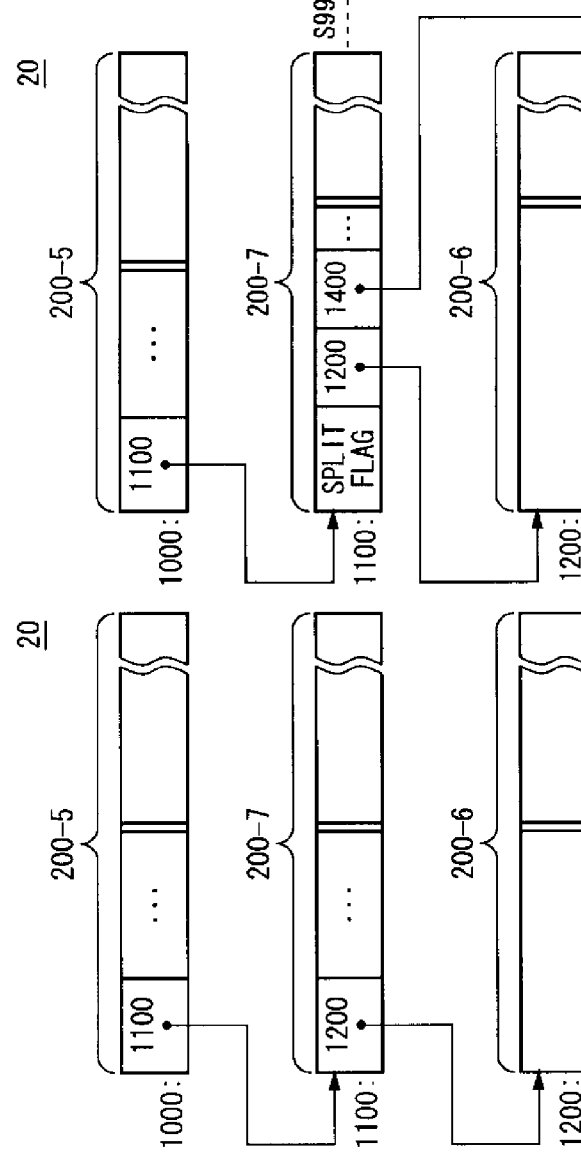
FIG. 14A
FIG. 14B

APPARATUS, SYSTEM, AND PROGRAM FOR DETERMINING CONSISTENCY OF A DATABASE

CROSS-REFERENCES TO RELATED APPLICATIONS

This patent application claims priority to a Japanese Patent Application No. 2005-236552 filed on Aug. 17, 2005, the entire contents of which are incorporated herein by reference for all purposes.

BACKGROUND OF THE INVENTION

1. Field of the Invention

The present invention relates to a system, a method and a program for determining consistency of a database.

2. Description of the Related Art

In order to determine consistency of a database, it has conventionally been necessary to compare a storage address of each segment data included in the database and each pointer included in the database and to determine whether they coincide with each other. For example, such a consistency determination is implemented and used in a database management system developed by the present applicant. See, for example, "IMS High Performance Pointer Checker User's Guide, URL publibfi.boulder.ibm.com/cgi-bin/bookmgr/BOOKS/fabp1b 10/CCONTENTS".

Here, when a database is updated between starting reading any one of the pointers and completely reading all the pointers, the segment data addresses may be compared with the pointers before and after updating. For this reason, during processing the determination of consistency, it has conventionally been general to stop updating a database or to perform exclusive control for access to at least a part of a database. See, for example, Japanese Published Patent Application No. 8-249222.

However, when the data size of a database is large, the updating may be stopped or delayed for a long time so that the user's convenience may be reduced. In contrast, a technique for determining consistency without stopping the updating is proposed as disclosed, for example, in Japanese Published Patent Application No. 2001-142765.

According to a technique disclosed in Japanese Published Patent Application No. 2001-142765, a consistency verifying apparatus takes out data for use in consistency verification from a database file without performing exclusive control. Then, the consistency verifying apparatus repeats the process for performing the consistency verification using the taken-out data by a predetermined number of times, and determines whether the database file is consistent based on the verification result of the process and a preset condition for determining the consistency. Therefore, it is considered that, according to this technique, a possibility of satisfying the consistency can be evaluated, but it is not possible to surely determine the consistency. From a different viewpoint, the number of times for performing the consistency verification should be increased to surely determine the consistency, which would result in a longer processing time.

SUMMARY OF THE INVENTION

Therefore, it is an object of the present invention to provide a system, a method, and a program that can solve the foregoing problems.

To solve the problems, the present invention provides a system for determining consistency of a database, which comprises a reading section that sequentially reads from the respective segment data included in the database pointers to other segment data, an address recording section that records storage addresses of segment data from which the pointers have been read by the reading section, a pointer recording section that records the pointers read by the reading section, an address modifying section that modifies a storage address recorded in the address recording section when segment data is updated in an area in which the pointer reading has been completed, a pointer modifying section that modifies a pointer recorded in the pointer recording section when segment data is updated in an area in which the pointer reading has been completed, and a determination section that determines that the database is consistent on condition that the respective storage addresses recorded in the address recording section coincide with the respective pointers recorded in the pointer recording section. The present invention further provides a program making an information processing apparatus function as the system, and a method for determining consistency of a database by means of the system.

According to the present invention, it is possible to more effectively determine consistency of a database than ever before.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 4 is a view showing an exemplary data structure of a history recording section;

FIGS. 12A and 12B are views showing an exemplary process in which segment data is added;

FIGS. 13A and 13B are views showing an exemplary process in which segment data is deleted;

FIGS. 14A and 14B are views showing an exemplary process in which segment data is divided;

DETAILED DESCRIPTION OF THE INVENTION

The invention will now be described based on the preferred embodiments, which do not intend to limit the scope of the present invention, but exemplify the invention. All of the features and the combinations thereof described below are not necessarily essential to the invention.

Figure 1:
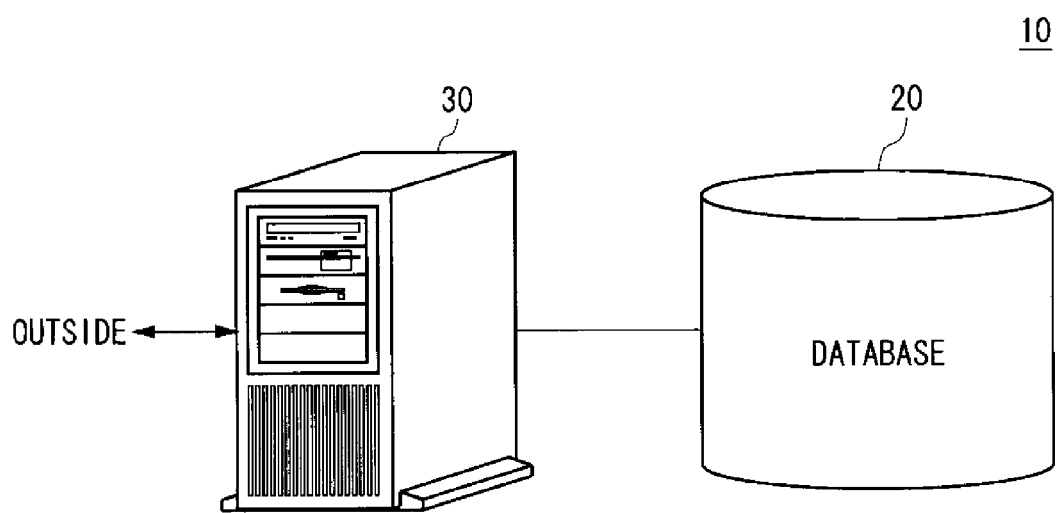
FIG. 1 is a schematic diagram showing a database system.

FIG. 1 is a schematic diagram showing a database system 10. The database system 10 includes a hierarchical database 20 and a database management system 30. The hierarchical database 20 includes a plurality of segment data. Further, each segment data has pointers for other segment data. The database management system 30 according to the present embodiment determines a consistency of the hierarchical database 20 by respectively comparing pointers and storage addresses of segment data.

Figure 2:
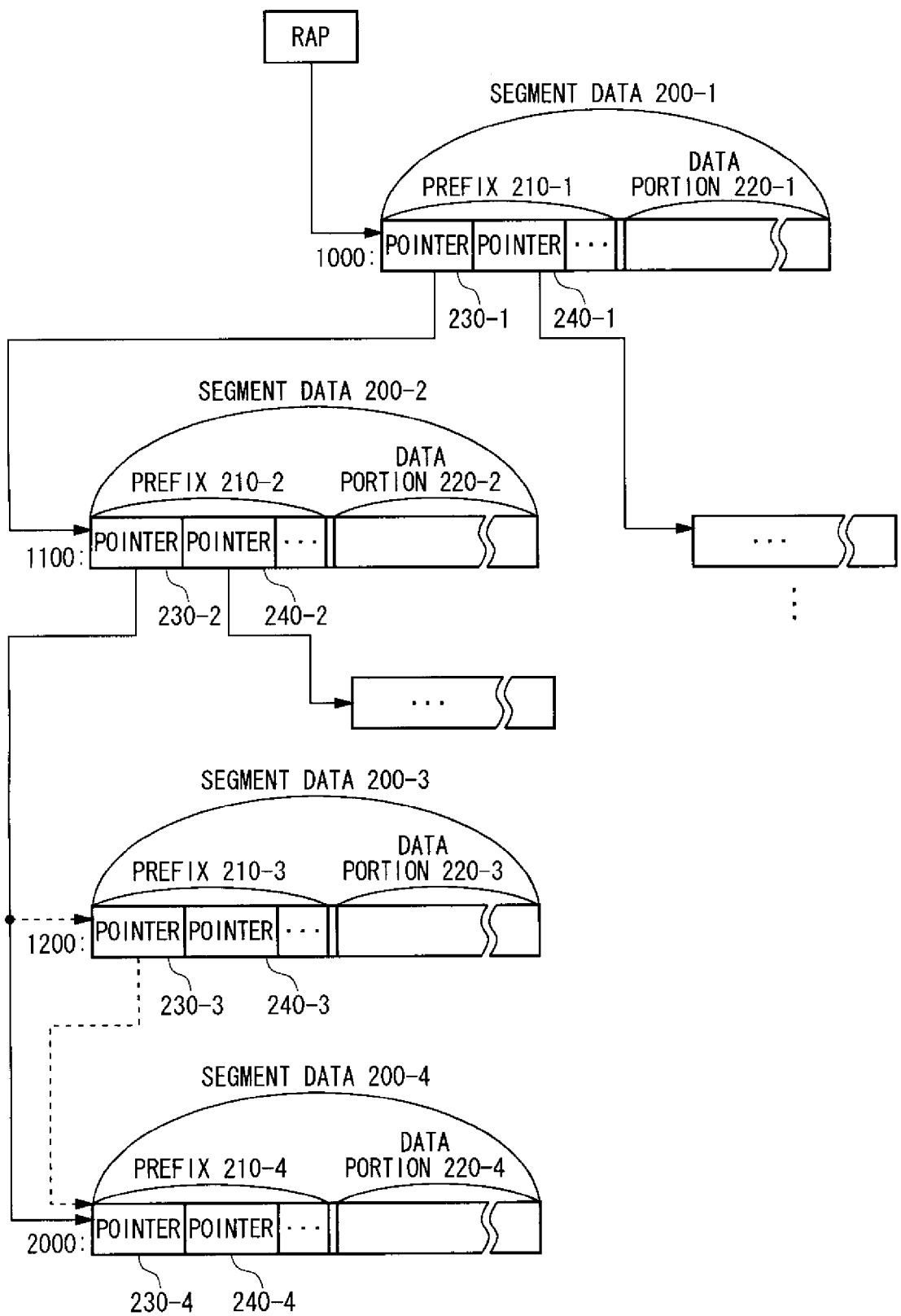
FIG. 2 is a view showing an exemplary data structure of a hierarchical database.

FIG. 2 is a view exemplary showing data structure of the hierarchical database 20. The hierarchical database 20 records a plurality of segment data represented by segment data 200-1 to 200-4. The segment data 200-1 is pointed to by a Root Anchor Point (RAP) showing a route part of the segment data. The segment data 200-1 includes a prefix 210-1 and a data portion 220-1. Further, a storage address of the segment data 200-1 is 1000. Here, a storage address means a position (RBA: Relative Byte Address) of a first address of the segment data 200-1, in which the first address is compared with a predetermined base address of the hierarchical database 20.

The prefix 210-1 includes a pointer 230-1 pointing to 1100 that is a storage address of the segment data 200-2 and a pointer 240-1 pointing to a storage address of another segment data. The segment data 200-2 includes a prefix 210-2 and a data portion 220-2. The prefix 210-2 includes a pointer 230-2 pointing to 2000 that is a storage address of the segment data 200-4 and a pointer 240-2 pointing to a storage address of further another segment data.

The segment data 200-4 includes a prefix 210-4 and a data portion 220-4. The segment data 200-4 is located at a terminal part of a series of hierarchical structure beginning with the segment data 200-1. For this reason, the prefix 210-4 does not have pointers pointing to any segment data. The prefix 210-4 may really include a predetermined data (e.g., Null data) that does not show any address as a pointer 230-4 and a pointer 240-4.

In this manner, the hierarchical database 20 has a hierarchical structure in which segment data can be sequentially accessed by tracing a pointer recorded in the prefix of each segment data. Therefore, in a state where the consistency is preserved, a value of a pointer coincides with a storage address of segment data pointed to by the pointer. The database management system 30 according to the present embodiment can determine the consistency of the hierarchical database 20 by comparing these pointers and storage addresses.

The segment data within the hierarchical database 20 may be updated at any time according to an instruction from a user. In the example of FIG. 2, there is shown with dotted lines connection relation of pointers when the segment data 200-3 is added between the segment data 200-2 and the segment data 200-4. That is to say, according to this addition process, the segment data 200-2 records a pointer pointing to the segment data 200-3 and the segment data 200-3 records a pointer pointing to the segment data 200-4.

In the past, when such an updating process occurs while determining consistency of a database, the consistency could not be determined correctly in some cases. For example, when the database is being updated, the segment data 200-3 may already be recorded in the hierarchical database 20 while the pointer 230-2 may still point to the segment data 200-4. In such a case, since the pointer and the storage address do not coincide with each other, it may be determined that the consistency is lost. In contrast, the database management system 30 according to the present embodiment can appropriately determine the consistency even though the hierarchical database 20 is updated during the consistency determination.

Figure 3:
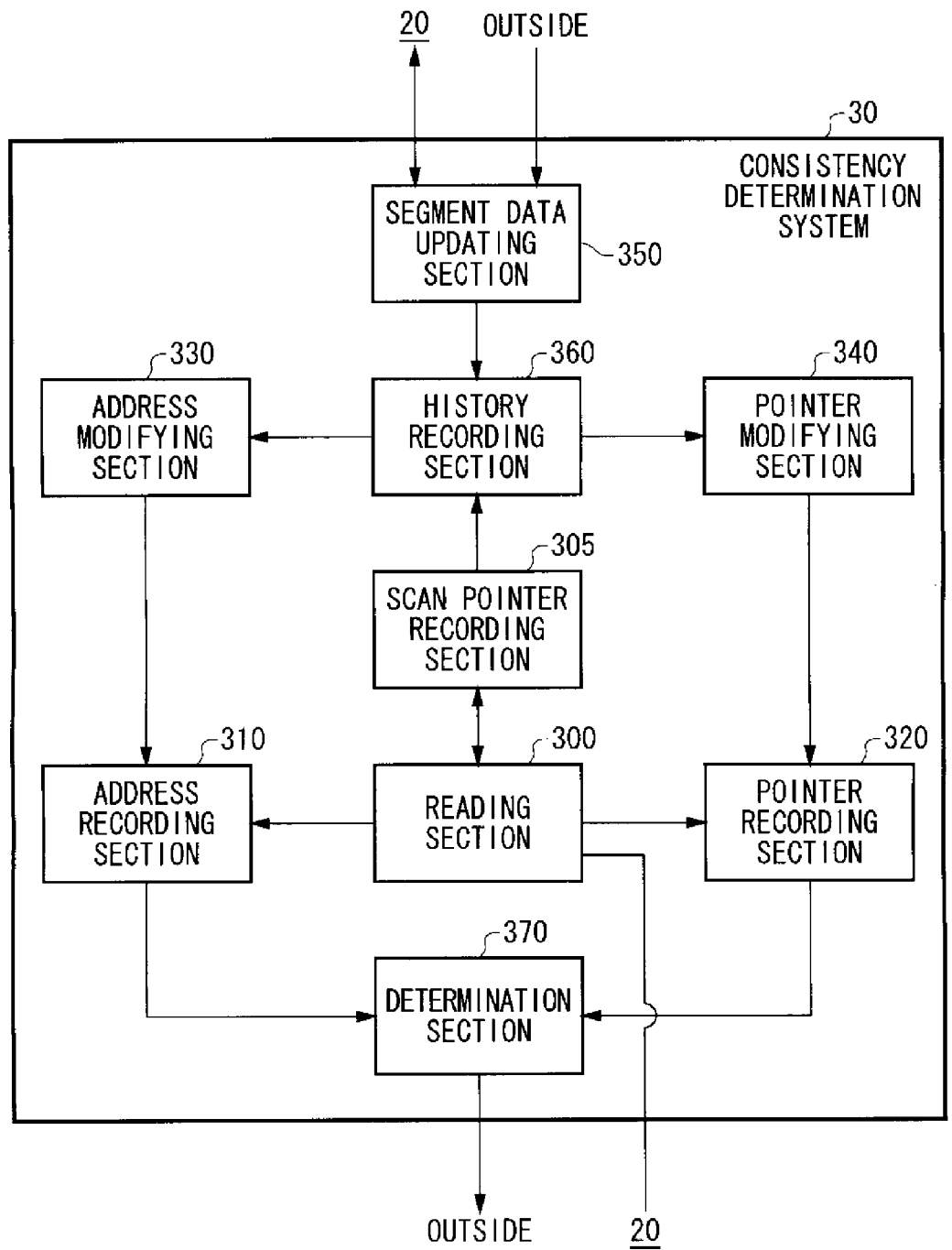
FIG. 3 is a functional block diagram showing functions of a database management system.

FIG. 3 is a functional block diagram showing functions of the database management system 30. The database management system 30 has a reading section 300, a scan pointer recording section 305, an address recording section 310, a pointer recording section 320, an address modifying section 330, a pointer modifying section 340, a segment data updating section 350, a history recording section 360, and a determination section 370. The reading section 300 sequentially reads pointers from the respective segment data included in the hierarchical database 20, which point to other segment data. Specifically, the reading section 300 first reads the pointer 1100 to the segment data 200-2 from the segment data 200-1. Next, the reading section 300 reads the pointer 2000 to the segment data 200-4 from the segment data 200-2. A similar process is repeatedly performed in a direction from the beginning to the end of the hierarchical database 20.

The scan pointer recording section 305 is an example of a read address recording section of the present invention, which records addresses already read by the reading section 300. Then, the scan pointer recording section 305 sequentially updates the address value in a predetermined ascending or descending order starting from a first address from which the reading is started as the reading section 300 performs the reading. This address value is referred to as a scan pointer. The address recording section 310 sequentially records storage addresses of the segment data from which the reading section 300 reads the pointers, with the advance of the reading process by the reading section 300. The pointer recording section 320 sequentially records the pointers read by the reading section 300 with the advance of the reading process by the reading section 300.

The address modifying section 330 modifies the storage address recorded in the address recording section 310 when the segment data is updated in an area in which the pointer reading has been completed. Whether or not the area in which the pointer reading has been completed is updated can be determined by means of a history recorded in the history recording section 360. Similarly, the pointer modifying section 340 modifies the pointer recorded in the pointer recording section 320 when the segment data is updated in an area in which the pointer reading has been completed.

The segment data updating section 350 updates the segment data in the hierarchical database 20 according to an instruction of a user received from the outside. This updating may be performed even when the consistency is being determined. The history recording section 360 determines whether the segment data is located in the area in which the pointer reading has been completed when the segment data updating section 350 updates the segment data. For example, the history recording section 360 may determine that the segment data is located in the area in which the pointer reading has been completed, on condition that the storage address of the segment data is nearer to the beginning than the address recorded in the scan pointer recording section 305. On condition that the segment data is located in the area in which the pointer reading has been completed, the history recording section 360 records its update history.

FIG. 4 shows an exemplary data structure of the history recording section 360. The second and third lines in the data structure of FIG. 4 show an update history for an addition process for the segment data described in FIG. 2. Further, an update history in the 3000 ths addresses is additionally shown in order to explain a deletion process for the segment data.

The history recording section 360 has a storage address recording area 400 to record a storage address of segment data to be updated. Further, the history recording section 360 has a pointer-before-modification recording area 410 that is an example of a first area according to the present invention and a pointer-after-modification recording area 420 that is an example of a second area according to the present invention. Whenever segment data is updated, the history recording section 360 records a storage address of the segment data in the storage address recording area 400, records a pre-modification value of a pointer included in the segment data in the pointer-before-modification recording area 410, and record a post-modification value of a pointer included in the segment data in the pointer-after-modification recording area 420.

For example, when a pointer 2000 has been modified into a pointer 1200 in the segment data of address 1100, the history recording section 360 records 1100 in the storage address recording area 400, records 2000 in the pointer-before-modification recording area 410, and records 1200 in the pointer-after-modification recording area 420. Further, when a pointer 3100 has been modified into a pointer 3200 in the segment data of address 3000, the history recording section 360 records 3000 in the storage address recording area 400, records 3100 in the pointer-before-modification recording area 410, and records 3200 in the pointer-after-modification recording area 420.

Further, when segment data has been added, the history recording section 360 records pointer absence information, which indicates that no pointer is included, in the pointer-before-modification recording area 410 in association with a storage address of the added segment data. This pointer absence information may be Null data having a predetermined value such as zero or minus one. Further, the history recording section 360 records a pointer included in the added segment data pointing to another segment data in the pointer-after-modification recording area 420 in association with the storage address of the added segment data.

For example, when segment data of address 1200 has been added, the history recording section 360 records 1200 in the storage address recording area 400, records Null in the pointer-before-modification recording area 410, and records address 2000 in the pointer-after-modification recording area 420.

Further, when segment data has been deleted, the history recording section 360 records a pointer pointing to another segment data, which the segment data has had before the deletion, in the pointer-before-modification recording area 410 in association with a storage address of the deleted segment data. Also, the history recording section 360 records pointer absence information in the pointer-after-modification recording area 420 in association with the storage address of the deleted segment data.

For example, when the segment data of address 3100 has been deleted, the history recording section 360 records 3100 in the storage address recording area 400, records 3200 in the pointer-before-modification recording area 410, and records Null in the pointer-after-modification recording area 420.

Figure 5:
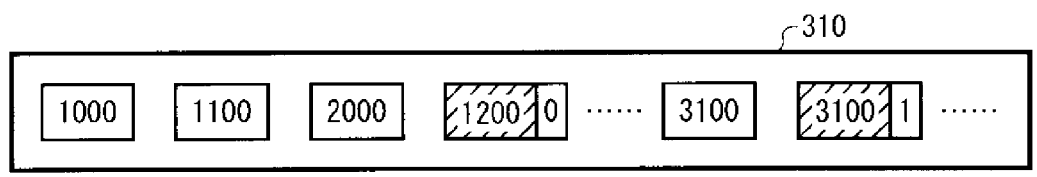
FIG. 5 is a view showing an exemplary storage address recorded in an address recording section.

FIG. 5 shows exemplary storage addresses recorded in the address recording section 310. The address recording section 310 sequentially records storage addresses of segment data from which pointers have been read by the reading section 300, with the advance of a reading process by the reading section 300. That is to say, the address recording section 310 records 1000, 1100, and 2000 in this sequence. After that, on condition that the segment data 200-3 has been added to the hierarchical database 20, the address modifying section 330 additionally records address 1200 in the address recording section 310.

Specifically, the address modifying section 330 first retrieves pointer absence information from the pointer-before-modification recording area 410 in the history recording section 360. When the pointer absence information is recorded in the pointer-before-modification recording area 410, the address modifying section 330 adds a storage address corresponding to the area to the address recording section 310. The address modifying section 330 may record the storage address in association with an addition flag (e.g., zero) indicating that the segment data of the address has been added.

Further, on condition that the segment data of address 3100 has been deleted from the hierarchical database 20, the address modifying section 330 excludes the address 3100 from the address recording section 310. Specifically, the address modifying section 330 retrieves pointer absence information from the pointer-after-modification recording area 420 in the history recording section 360. When the pointer absence information is recorded in the pointer-after-modification recording area 420, the address recording section 310 excludes a storage address corresponding to the area from the address recording section 310. In detail, the address modifying section 330 may record the storage address in the address recording section 310 in association with a deletion flag (e.g., one) indicating that the storage address has been deleted, in order to exclude the storage address from the address recording section 310.

Figure 6:
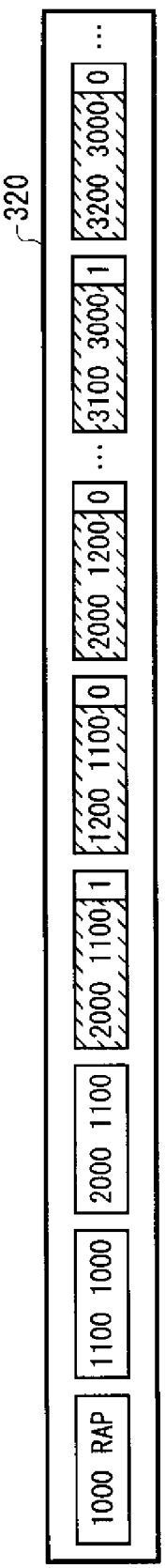
FIG. 6 is a view showing an exemplary pointer recorded in a pointer recording section.

FIG. 6 shows exemplary pointers recorded in the pointer recording section 320. The pointer recording section 320 sequentially records pointers read from each segment data in association with a storage address of the segment data. For example, the pointer recording section 320 records "1100 1000" as the pointer 1100 is read from the segment data of address 1000. After that, on condition that a pointer in the segment data 200-2 has been modified, the pointer modifying section 340 excludes a pointer before modification from the pointer recording section 320 and adds a pointer after modification to the pointer recording section 320.

Specifically, the pointer modifying section 340 first reads pointers from the pointer-before-modification recording area 410 in the history recording section 360. Next, the pointer modifying section 340 adds each of the read pointers to the pointer recording section 320 in association with a deletion flag (e.g., one) indicating that the pointer has been deleted, in order to excludes the pointer from the pointer recording section 320. Further, the pointer modifying section 340 reads pointers from the pointer-after-modification recording area 420 in the history recording section 360. Then, the pointer modifying section 340 adds each of the read pointers to the pointer recording section 320 in association with an addition flag (e.g., zero) indicating that the pointer has been added.

More particularly, since the pointer 2000 is modified into the pointer 1200 in the segment data of address 1100, the pointer 2000 is recorded in association with a deletion flag and the pointer 1200 is recorded in association with an addition flag. Further, since a pointer pointing to the address 2000 is newly added in the segment data of address 1200, the pointer 2000 is recorded in association with an addition flag.

Figure 7:
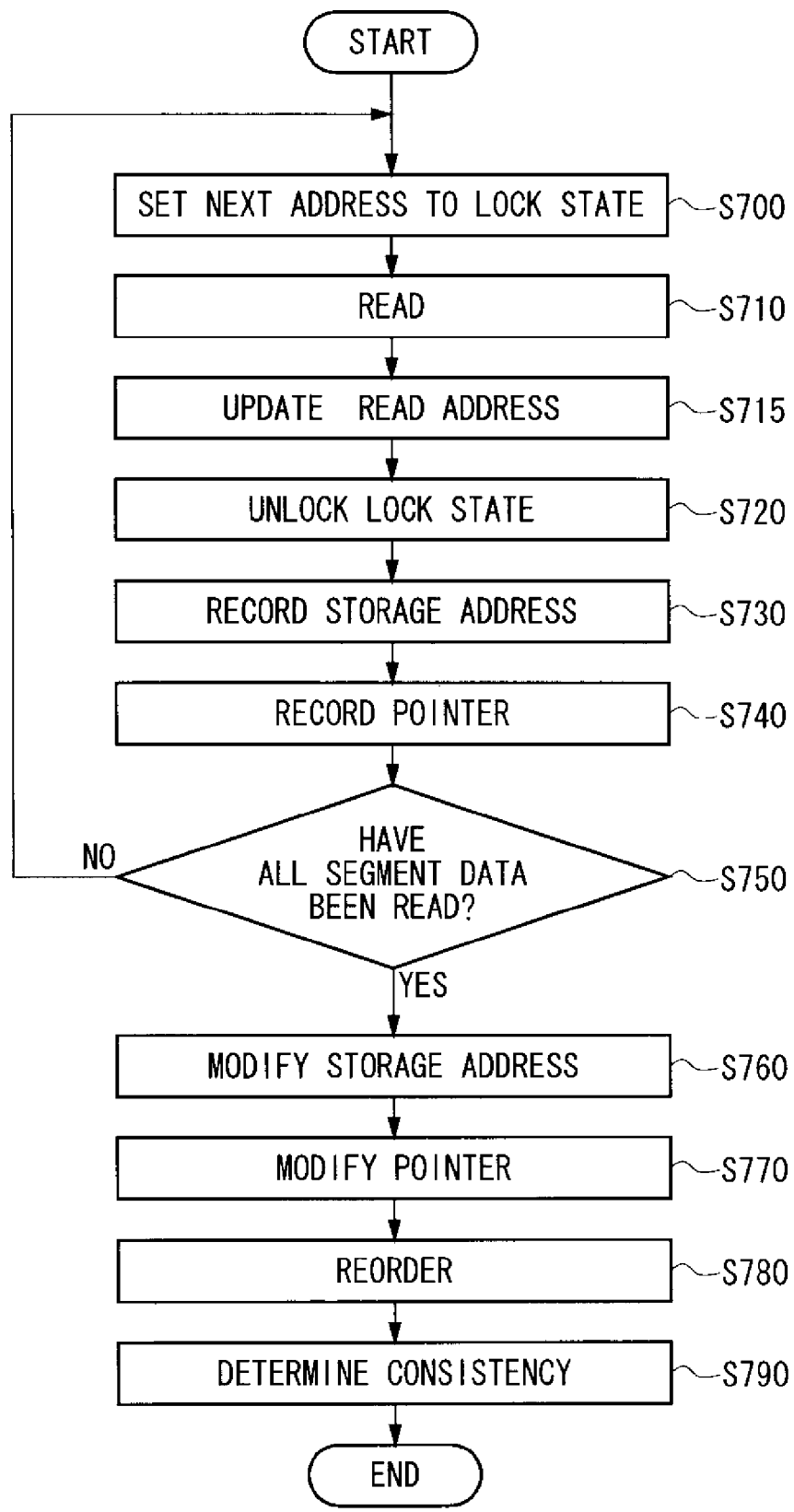
FIG. 7 is a view showing a flow of a process for modifying a storage address and a pointer to determine consistency.

FIG. 7 shows a flow of a process for modifying a storage address and a pointer to determine consistency. The reading section 300 sets segment data having an address next to an address recorded in the scan pointer recording section 305 to a lock state so that the segment data can be read and written exclusively (S700). Next, the reading section 300 reads a pointer from the segment data having the next address in the lock state (S710). Further, the reading section 300 records the address to be read in the scan pointer recording section 305 in the lock state (S715). Then, the reading section 300 unlocks the lock state (S720).

Next, the address recording section 310 records a storage address of the segment data from which the reading section 300 has read a pointer (S730). Further, the pointer recording section 320 records the pointer read by the reading section 300 (S740). The above-mentioned process is repeated until pointers are read from all the segment data (S750).

When all the segment data have been read (S750: YES), the address modifying section 330 modifies a storage address recorded in the address recording section 310 on condition that segment data is updated in an area in which the pointer reading has been completed (S760). For example, the address modifying section 330 may record a storage address of the deleted segment data in the address recording section 310 in association with a deletion flag indicating that the segment data has been deleted.

Further, the pointer modifying section 340 modifies a pointer recorded in the pointer recording section 320 on condition that the segment data is updated in the area in which the pointer reading has been completed (S770). For example, the pointer modifying section 340 may record the deleted pointer in the pointer recording section 320 in association with a deletion flag indicating that the pointer been deleted.

Next, the address modifying section 330 reorders a plurality of storage addresses recorded in the address recording section 310 in ascending or descending order according to their address values on condition that a storage address has been added to the address recording section 310(S780). In this way, it is possible to easily compare a storage address with a pointer in the following step S790.

Note that the address recording section 310 records storage addresses in ascending or descending order according to their address values as the scan pointer is updated in the ascending or descending order. Therefore, it is preferable that the address modifying section 330 does not reorder the storage addresses if no storage address is added. As a result, it is possible to improve process efficiency by omitting useless reordering.

Figure 8:
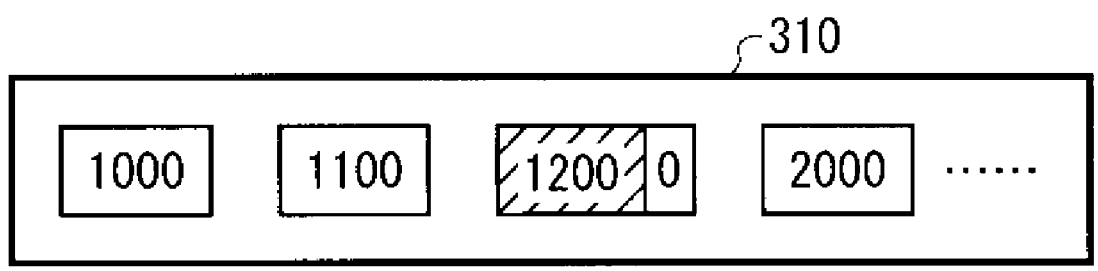
FIG. 8 is a view showing an exemplary storage address after reordering.

FIG. 8 shows exemplary storage addresses after the reordering process. The address 1200 is arranged next to the address 1100 by the reordering process.

Returning to FIG. 7, it is also preferable that the pointer modifying section 340 reorders a plurality of pointers recorded in the pointer recording section 320 in ascending or descending order according to their values, in which added or excluded pointers are included. A direction or order of the reordering by the address modifying section 330 should be the same as that of the pointer modifying section 340. That is to say, when the address modifying section 330 reorders addresses in ascending order, the pointer modifying section 340 also reorders pointers in ascending order. When the address modifying section 330 reorders addresses in descending order, the pointer modifying section 340 also reorders pointers in descending order.

Figure 9:
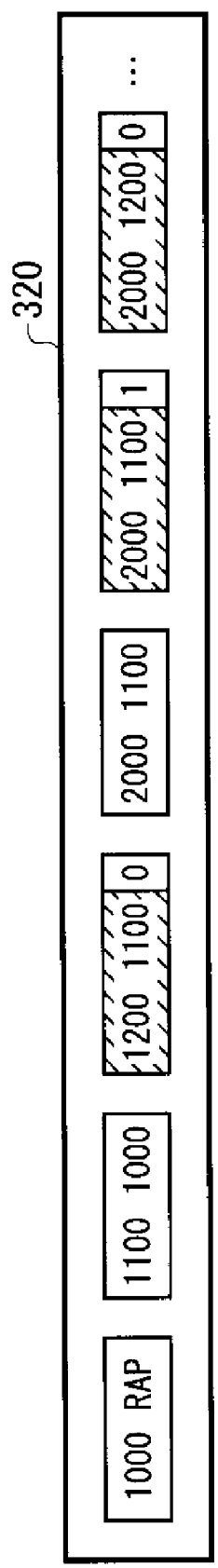
FIG. 9 is a view showing an exemplary pointer after reordering.

FIG. 9 shows exemplary pointers after the reordering process. The pointer 1200 is arranged next to the pointer 1100. Further, the pointer 2000 that has been already read, the pointer 2000 that is associated with a deletion flag, and the pointer 2000 that is newly added are continuously arranged.

Returning to FIG. 7, on condition that the storage address recorded in the address recording section 310 coincides with the pointer recorded in the pointer recording section 320, the determination section 370 determines that the hierarchical database 20 is consistent (S790). Specifically, the determination section 370 excludes a pointer associated with a deletion flag and other pointers having the same value as that of the pointer from the plurality of pointers recorded in the pointer recording section 320. In the example of FIG. 9, since the pointer "2000 1100" is recorded in association with a deletion flag, it is excluded from the pointers to be compared. Instead, the pointer "2000 1200" associated with an addition flag becomes an object to be compared.

Similarly, the determination section 370 excludes an address associated with a deletion flag and other addresses having the same value as that of the address from the plurality of storage addresses recorded in the address recording section 310. Since segment data between address 1000 and address 2000 are not deleted, no address is excluded in the example of FIG. 8. Then, the determination section 370 uses a storage address of the added segment data as an object to be compared. In FIG. 8, the address 1200 is added as an object to be compared.

The determination section 370 sequentially reads one by one from the beginning and compares storage addresses recorded in the address recording section 310 and pointers recorded in the pointer recording section 320. That is to say, the determination section 370, for example, reads the address 1000 from the address recording section 310 and the pointer "1000 RAP" from the pointer recording section 320, and compares them. In this case, since both have the same value 1000, it is determined that consistency is preserved. Further, the determination section 370 reads the address 1100 from the address recording section 310 and the pointer "1100 1000" from the pointer recording section 320, and compares them. Also, in this case, since both have the same value 1100, it is determined that consistency is preserved.

The determination section 370 sequentially reads and compares addresses and pointers in this manner, and determines that the hierarchical database 20 is consistent when each comparison has shown accordance. On the other hand, the determination section 370 determines that the hierarchical database 20 is not consistent when one of the pointers does not coincide with any storage address. In this case, the determination section 370 may preferably output the pointer in association with an address of the segment data including the pointer. That is to say, for example, the determination section 370 outputs the pointer "1100 1200" when the pointer 1100 does not coincide with any address. In this way, it is possible to easily identify a specific point at which an access failure has occurred.

Figure 10:
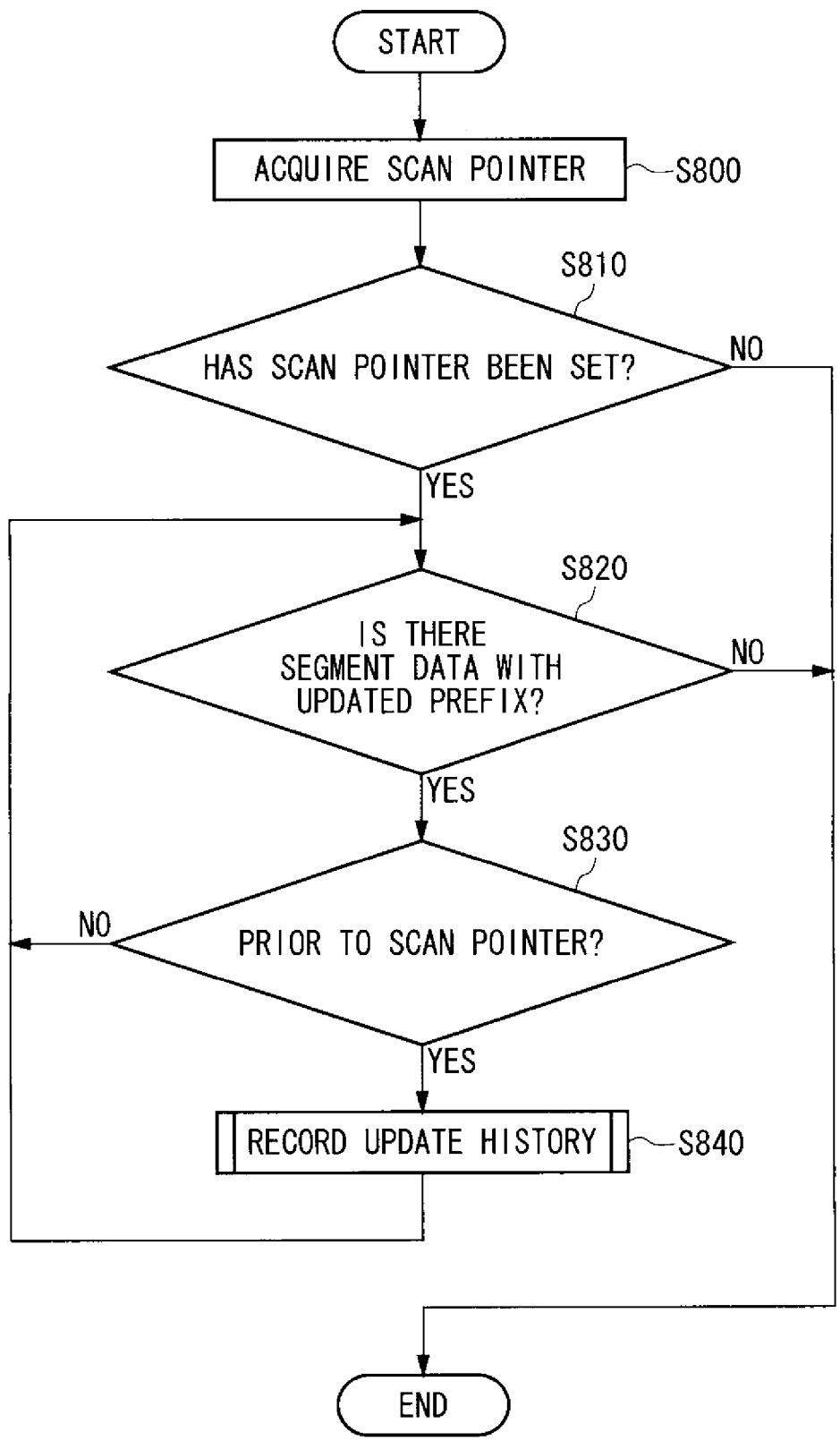
FIG. 10 is a view showing a flow of a process for recording an update history.

Next, a detailed process for recording the update history by the history recording section 360 will be described with reference to FIGS. 10 to 14. FIG. 10 shows a flow of the process for recording the update history. Whenever the hierarchical database 20 is updated, the database management system 30 performs the following on condition that a series of updating processes for the hierarchical database 20 have been completed and thus the next updating process can be performed. First, the history recording section 360 acquires a scan pointer from the scan pointer recording section 305 (S800). Next, the history recording section 360 determines whether an effective value is set in the scan pointer in order to determine whether consistency is being determined (S810).

When an effective value is not set in the scan pointer (S810: NO), the history recording section 360 terminates the process. On the other hand, when an effective value is set in the scan pointer (S810: YES), the history recording section 360 determines whether there is segment data with a prefix modified by the updating (S820). When such segment data does not exist (S820: NO), the history recording section 360 terminates the process.

On the other hand, when segment data with an updated prefix exists (S820: YES), it is determined whether the updated segment data is recorded at the same address as or prior to the scan pointer (S830). When the updated segment data resides in an area that is nearer to the beginning than the scan pointer (S830: YES), the history recording section 360 records the update history (S840) and returns the process to S820.

Figure 11:
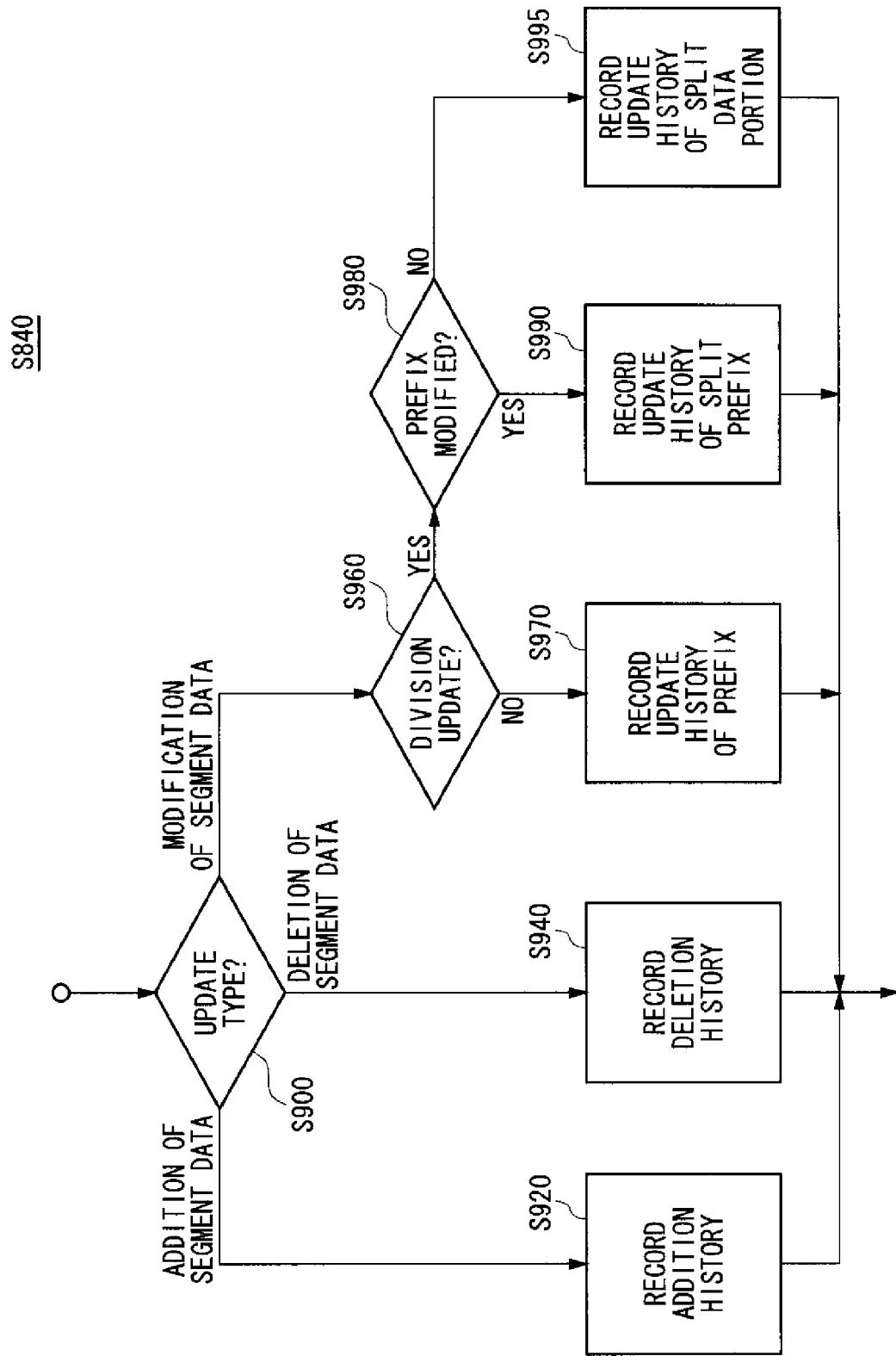
FIG. 11 is a view showing details of a process in S840 shown in FIG. 10.

FIG. 11 shows details of processing in S840 shown in FIG. 10. The history recording section 360 determines an update type indicating how the hierarchical database 20 is updated (S900). When the update type is addition of segment data (S900: addition of segment data), the history recording section 360 records a history of adding the segment data (S920). That is to say, the history recording section 360 records a storage address of the segment data in the storage address recording area 400, records pointer absence information in the pointer-before-modification recording area 410, and records a value of a pointer newly generated in the segment data in the pointer-after-modification recording area 420.

On the other hand, when the update type is content modification of the existing segment data (S900: modification of segment data), the history recording section 360 determines whether the update type is a split update that splits off a part of a certain segment data to make another segment data (S960). When it is not the split update (S960: NO), the history recording section 360 records an update history of the prefix. That is to say, for example, the history recording section 360 records a storage address of segment data to be updated in the storage address recording area 400, records a value of a pointer before modification included in the segment data in the pointer-before-modification recording area 410, and records a value of the pointer after modification in the pointer-after-modification recording area 420.

On the other hand, when it is the split update (S960: YES), the history recording section 360 determines whether the prefix is modified in the split update (S980). When it is the modification of prefix, the history recording section 360 records an update history of the prefix in the split update (S990). On the other hand, when it is not the modification of prefix (S980: NO), the history recording section 360 records an update history of a data portion in the split update. Details of a method for recording the update history in the split update will be described with reference to FIG. 14.

FIGS. 12A and 12B show an exemplary process in which segment data is added. FIG. 12A shows the hierarchical database 20 before adding segment data. The hierarchical database 20 includes segment data 200-5 having a storage address of 1000 and segment data 200-6 having a storage address of 1200. The segment data 200-5 includes a pointer to the segment data 200-6 in the prefix.

FIG. 12B shows the hierarchical database 20 and the history recording section 360 after adding segment data. When segment data 200-7 is added between the segment data 200-5 and the segment data 200-6, the segment data updating section 350 modifies the pointer to the segment data 200-6 included in the segment data 200-5 into a storage address of the segment data 200-7. Then, the segment data updating section 350 generates a pointer to the segment data 200-6 in the segment data 200-7.

As a result, the hierarchical database 20 includes the newly added segment data 200-7 in an area having a storage address of 1100. Then, the segment data 200-5 includes a pointer (i.e., 1100) to the segment data 200-7 in place of the pointer (i.e., 1200) to the segment data 200-6, and the segment data 200-7 includes the pointer (i.e., 1200) to the segment data 200-6.

Further, since the pointer in the segment data 200-5 has been modified from 1200 to 1100, the history recording section 360 records 1000 that is a storage address of the segment data 200-5 in the storage address recording area 400, records 1200 that is a storage address of the segment data 200-6 in the corresponding pointer-before-modification recording area 410, and records 1100 that is a storage address of the segment data 200-7 in the corresponding pointer-after-modification recording area 420 (corresponding to the processing in S970).

Further, since the segment data 200-7 has been newly added, the history recording section 360 records 1100 that is a storage address of the segment data 200-7 in the storage address recording area 400, records pointer absence information (e.g., NULL) in the corresponding pointer-before-modification recording area 410, and records 1200 that is a storage address of the segment data 200-6 in the corresponding pointer-after-modification recording area 420 (corresponding to the processing in S920).

FIGS. 13A and 13B show an exemplary process in which segment data is deleted. FIG. 13A shows the hierarchical database 20 before deleting segment data. The hierarchical database 20 includes segment data 200-5 having a storage address of 1000, segment data 200-6 having a storage address of 1200, and segment data 200-7 having a storage address of 1100. The segment data 200-5 includes a pointer to the segment data 200-7 in the prefix and the segment data 200-7 includes a pointer to the segment data 200-6 in the prefix.

FIG. 13B shows the hierarchical database 20 and the history recording section 360 after deleting the segment data. When the segment data 200-7 between the segment data 200-5 and the segment data 200-6 is deleted, the segment data updating section 350 modifies the pointer to the segment data 200-7 included in the segment data 200-5 into a storage address of the segment data 200-6.

As a result, the hierarchical database 20 does not include the deleted segment data 200-7. Further, the segment data 200-5 includes a pointer (i.e., 1200) to the segment data 200-6 in place of the pointer (i.e., 1100) to the segment data 200-7.

Further, since the pointer in the segment data 200-5 has been modified from 1100 to 1200, the history recording section 360 records a storage address of the segment data 200-5 in the storage address recording area 400, records a storage address of the segment data 200-7 in the corresponding pointer-before-modification recording area 410, and records a storage address of the segment data 200-6 in the corresponding pointer-after-modification recording area 420 (corresponding to the processing in S970).

Further, since the segment data 200-7 has been deleted, the history recording section 360 records a storage address of the segment data 200-7 in the storage address recording area 400, records a storage address of the segment data 200-6 in the corresponding pointer-before-modification recording area 410, and records pointer absence information in the corresponding pointer-after-modification recording area 420 (corresponding to the processing in S940).

FIGS. 14A and 14B show an exemplary process in which segment data is split. FIG. 14A shows the hierarchical database 20 before splitting segment data. Since a state before splitting is generally equal to FIG. 13A, its description is omitted. FIG. 14B shows the hierarchical database 20 and the history recording section 360 after splitting the segment data. With reference to FIGS. 14A and 14B, a process for splitting one segment data into one or more other segment data by the segment data updating section 350 will be described.

The segment data updating section 350 splits off a part of segment data 200-7 having a pointer pointing to segment data 200-6 to make new segment data 200-8. At this time, the segment data updating section 350 adds a pointer pointing to the segment data 200-8 to the segment data 200-7, and adds a split flag indicating that a part of the segment data 200-7 has been split off.

The history recording section 360 records 1100 that is a storage address of the segment data 200-7 in the storage address recording area 400 when the segment data 200-7 is split. Then, the history recording section 360 records a pointer which the segment data 200-7 has had before splitting in the pointer-before-modification recording area 410 in association with the storage address of the segment data 200-7. That is to say, the history recording section 360 records 1200 that is a pointer pointing to the segment data 200-6 in the pointer-before-modification recording area 410.

Further, the history recording section 360 records a pointer pointing to the segment data 200-6, a split flag indicating that the segment data 200-7 has been split, and a pointer pointing to the split-off segment data 200-8, in the pointer-after-modification recording area 420 (corresponding to the processing in S990). Here, it is desirable that the pointer pointing to the split-off segment data 200-8 is recorded at a predetermined record position in the pointer-after-modification recording area 420 so that it is distinguished from other pointers. That is to say, in the example of FIG. 14B, address 1400 is recorded in a predetermined ending area in the pointer-after-modification recording area 420.

Since the segment data 200-8 has been added to the hierarchical database 20, the history recording section 360 also records that fact. Specifically, the history recording section 360 records 1400 that is a storage address of the segment data 200-8 in the storage address recording area 400, records pointer absence information in the corresponding pointer-before-modification recording area 410, and records a split-off flag indicating that the segment data is split-off data in the corresponding pointer-after-modification recording area 420 (corresponding to the processing in S995).

When segment data is split, the pointer modifying section 340 operates the pointer recording section 320, for example, as described below. Specifically, on condition that a split flag is recorded in the pointer-after-modification recording area 420, the pointer modifying section 340 first reads a storage address of the split-off segment data from the pointer-after-modification recording area 420. Here, the storage address of the split-off segment data can be read from a predetermined record position in the pointer-after-modification recording area 420. Then, the pointer modifying section 340 records the read storage address in the pointer recording section 320 as an added pointer in association with a predetermined addition flag. In this way, the segment data newly added by the splitting can also be considered in the consistency determination.

As described above with reference to FIGS. 10 to 14, the database management system 30 can instantly determine whether segment data to be updated is located at an already read address by comparing a scan pointer and an address value. When the segment data located at the already read address is updated, a history of the updating is recorded in the history recording section 360. Since the amount of processing of these processes is small, they do not significantly increase the load of the database management system 30. Therefore, the database management system 30 can assign a lot of computing power to a normal transaction for the hierarchical database 20.

In a case where computing power of the database management system 30 significantly exceeds computing power necessary for a normal transaction, the database management system 30 may perform processing for modifying a storage address and a pointer (S760 and S770) whenever segment data is updated. In this case, the history recording section 360 does not have to accumulate a modification history of segment data. Therefore, it is possible to save a storage capacity in the database management system. Furthermore, since the modification of a storage address and a pointer (S760 and S770) may not be performed after all segment data have been read (S750: YES), it is possible to reduce post-processing time necessary after the segment data have been read.

As described above with reference to FIGS. 1 to 14, the database management system 30 records an update history of a pointer that is updated during processing for the consistency determination in the form capable of identifying its updated contents. Then, when an area in which pointer reading has been completed is updated, the pointer and address values are modified based on the updated contents. In this way, even though the hierarchical database 20 is updated during processing for the consistency determination, it is possible to appropriately determine consistency.

Further, the updated pointer and address values are reordered along with pointers and addresses already read in advance of consistency determination. As a result, consistency can be determined by sequentially reading and comparing the recorded pointers and addresses from the beginning. In this way, it is possible to perform consistency determination with the same level of efficiency as the conventional technique.

Figure 15:
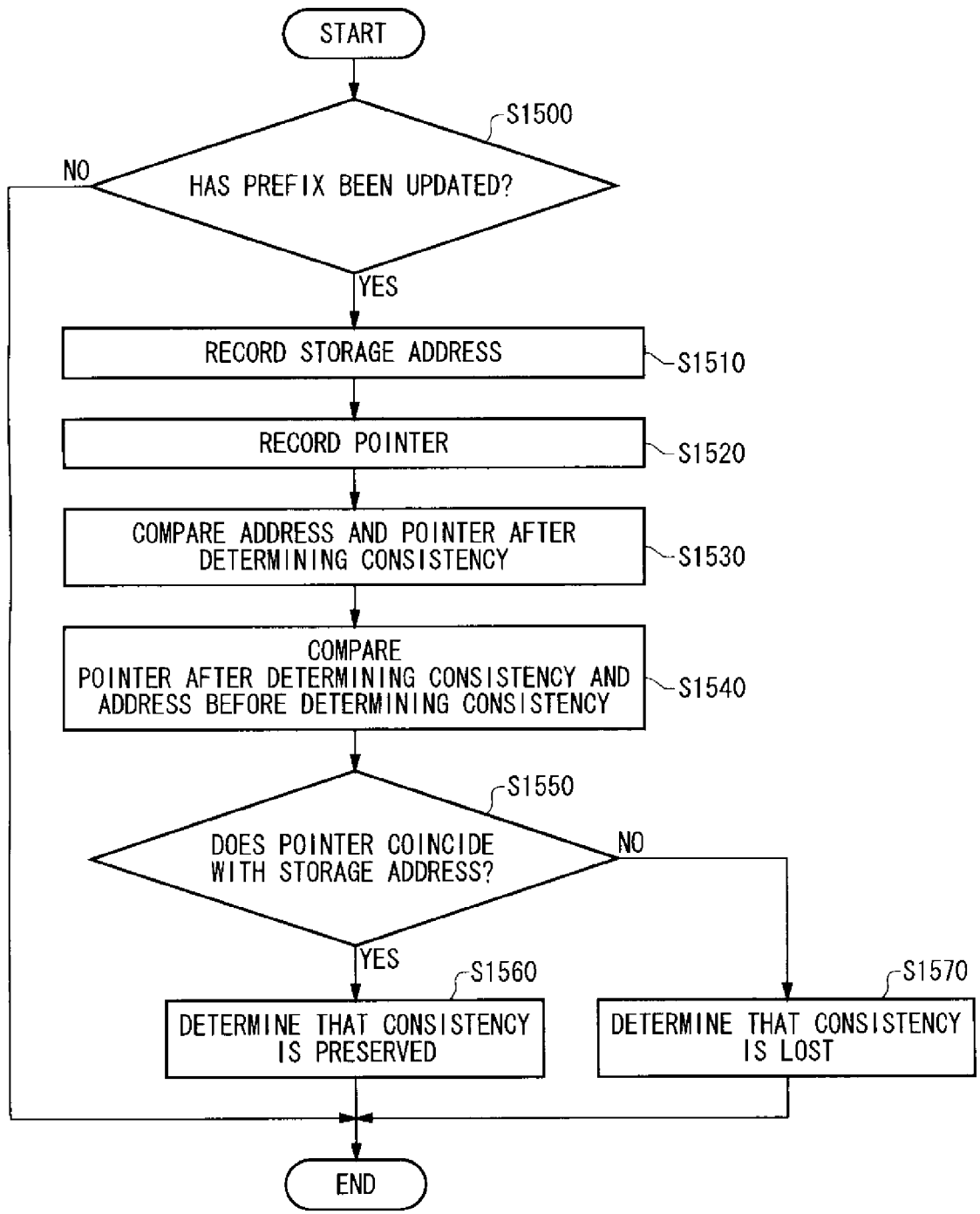
FIG. 15 is a view showing an exemplary process for determining consistency of segment data updated after the consistency determination.

FIG. 15 shows an exemplary process for determining consistency of segment data updated after consistency determination. It exemplifies a process for determining whether consistency is preserved when some segment data is updated in the state where the hierarchical database 20 is consistent. According to this process, it can be determined whether consistency is preserved by determining consistency on only the updated part and thus a process for determining consistency can be improved still more.

The database management system 30 may regularly performs the following process on condition that the determination section 370 has determined that the hierarchical database 20 is consistent. The history recording section 360 determines whether the prefix of some segment data has been updated in the consistent state (S1500). If the prefix has been updated (S1500: YES), the address recording section 310 further records a storage address of the segment data added or deleted by the updating in addition to the storage addresses already recorded to determine consistency (S1510). This storage address may be recorded by the address modifying section 330 based on the update history recorded in the history recording section 360.

Next, the pointer recording section 320 further records the pointer modified by the updating (S1520). Specifically, this pointer may be recorded by the pointer modifying section 340 based on the update history recorded in the history recording section 360.

The determination section 370 compares the respective pointers after modification recorded in the pointer recording section 320 after the database has been determined to be consistent and the respective storage addresses of the added segment data recorded in the address recording section 310 after the database has been determined to be consistent (S1530). Further, the determination section 370 compares the respective pointers after modification recorded in the pointer recording section 320 after the database has been determined to be consistent and the respective addresses sequentially recorded by the address recording section 310 before the consistency determination to determine consistency (S1540). However, any storage address recorded in association with a deletion flag is excluded from the comparison.

If each of the pointers coincides with any storage address before or after the consistency determination (S1550: YES), the determination section 370 determines that the consistency of the hierarchical database 20 is preserved (S1560). On the other hand, if at least one pointer does not coincide with any storage address (S1550: NO), the determination section 370 determines that the consistency of the hierarchical database 20 has been lost (S1570).

As described above, according to the process shown in FIG. 15, it is possible to confirm that consistency of the hierarchical database 20 is preserved by determining consistency on only updated elements once consistency has been determined. As a result, a process for determining consistency can be improved still more.

Figure 16:
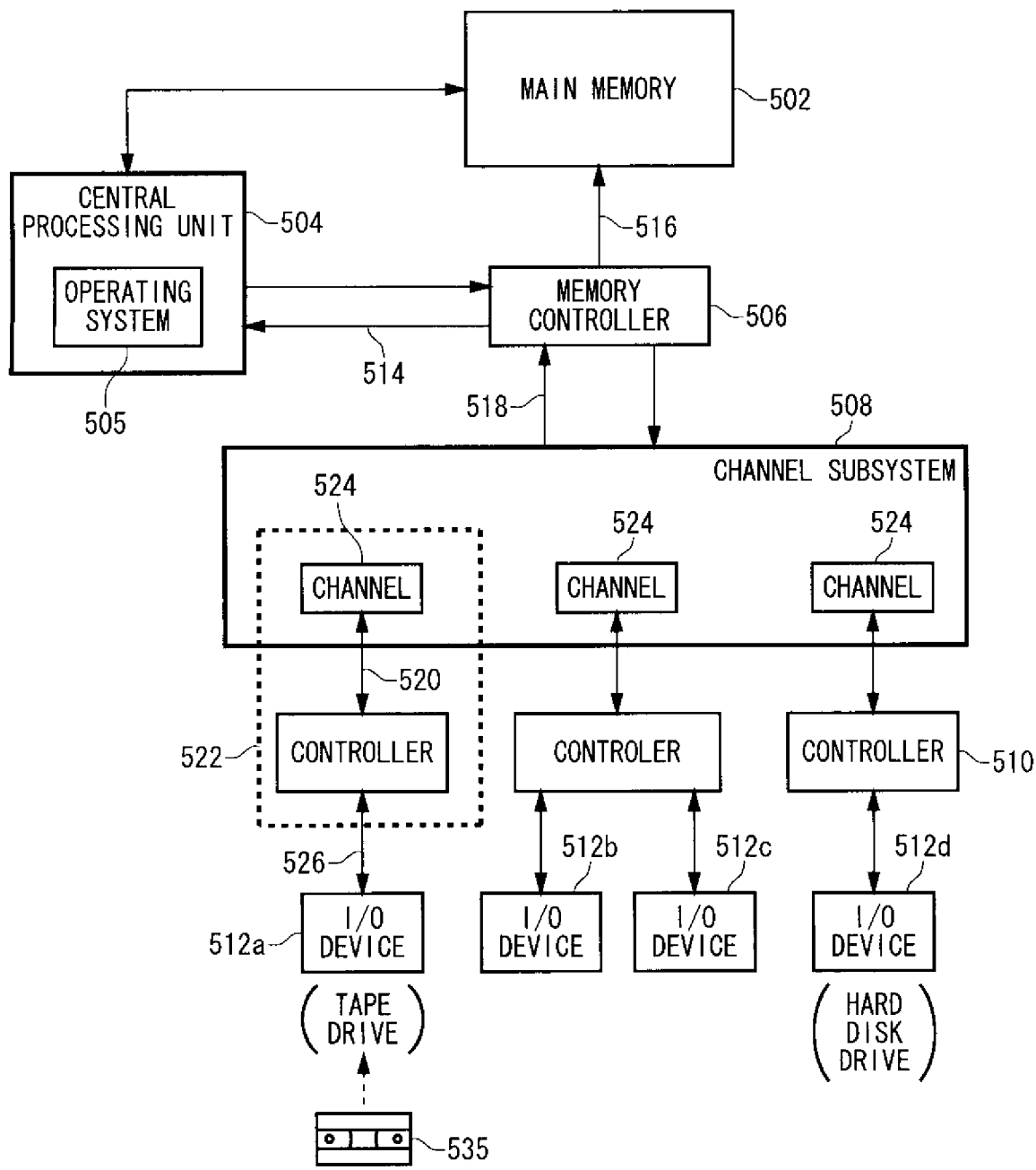
FIG. 16 is a view showing an exemplary hardware configuration of an information processing apparatus functioning as a database management system.

FIG. 16 shows an exemplary hardware configuration of an information processing apparatus 500 functioning as the database management system 30. In FIG. 15, the information processing apparatus 500 is assumed to be a large-scale general purpose computer referred to as a mainframe. The information processing apparatus 500 includes a main memory 502, at least one central processing unit 504, a memory controller 506, a channel subsystem 508, at least one control unit 510, and one or more I/O devices 512a to 512d.

The main memory 502 stores data and programs input from the I/O devices 512a to 512d. When the main memory 502 is addressed by the central processing unit 504 or the channel subsystem 508, it sends data stored at the specified address to the central processing unit 504 or the channel subsystem 508. The main memory 502 can access the data stored therein at high speed to enable fast operations of the central processing unit 504.

The central processing unit 504 plays the main role of controlling the entire information processing apparatus 500, and executes, e.g., at least one operating system 505. The operating system 505 controls program execution and input/output processing in the information processing apparatus 500. For example, the operating system 505 may control the execution of another program running on the central processing unit 504, or may control data transfer to or from each of the I/O devices 512a to 512d.

The memory controller 506 is connected to the central processing unit 504 via a bus 514 capable of performing two-way or one-way communication. The memory controller 506 is also connected to the main memory 502 via a bus 516, and is connected to the channel subsystem 508 via a bus 518. The memory controller 506 may temporarily retain or queue an access request received from the central processing unit 504 or the channel subsystem 508, and send the access request to the main memory 502 at predetermined timing.

The channel subsystem 508 is connected to each controller 510 via a data transfer path 520. The channel subsystem 508 controls data transfer between the I/O devices 512a to 512d and the main memory 502. Since this reduces processing load on the central processing unit 504 for communicating with the I/O devices 512a to 512d, it is possible to execute arithmetic operations by the central processing unit 504 in parallel with input/output operations by the I/O devices 512a to 512d, so that the information processing apparatus 500 can be efficiently operated.

The channel subsystem 508 transfers data to or from the I/O devices 512a to 512d via at least one channel path 522. Each channel path 522 has a channel 524 provided in the channel subsystem 508. Also, each channel path 522 has at least one controller 510 and data transfer path 520. Note here that the data transfer path 520 may be a serial link based on ESCON (Enterprise Systems Connection Architecture), for example. Alternatively, the data transfer path 520 may be a parallel OEMI or a fiber channel.

The controller 510 controls at least one of the I/O devices 512a to 512d. For example, the controller 510 may control data transfer timing for the I/O devices 512a to 512d. The controller 510 is connected with at least one of the I/O devices 512a to 512d via a bus 526. The controller 510 can be connected with up to 256 I/O devices.

Each of the I/O devices 512a to 512d transfers data to or from the main memory 502 via the controller 510, the channel subsystem 508, and the memory controller 506. In this configuration, the I/O device 512a is a magnetic tape drive, and the I/O device 512d is a hard disk drive. Alternatively or additionally, the I/O devices 512a to 512d may be a display, a keyboard, a printer, a communication device, a sensor, or any other storage device. As an example, at least one of the I/O devices 512a to 512d may be connected to and access the hierarchical database 20.

A program provided to the information processing apparatus 500 is stored in a recording medium such as a tape recording medium 535 and is provided by a user. The program is read by the I/O device 512a and is stored into the main memory 502 via the channel subsystem 508. Then, the program stored into the main memory 502 is installed into the I/O device 512d (hard disk drive) via the channel subsystem 508. Since the operations that the program causes the information processing apparatus 500 to perform are the same as those in the database management system 30 described with reference to FIGS. 1 to 15, their descriptions will be omitted.

The program described above may be stored in an external storage medium. The storage medium may be a flexible disk, a CD-ROM, an optical recording medium such as a DVD or a PD, a magneto-optical recording medium such as an MD, or a semiconductor memory such as an IC card. Alternatively, a storage device such as a hard disk or a RAM provided in a server system connected to a private communication network or the Internet may be used as a recording medium from which the program may be provided to the information processing apparatus 500 via the network.

While the present invention has been described with reference to the preferred embodiments, the technical scope of the present invention is not limited thereto. It should be understood by those skilled in the art that various modifications or improvements can be added to the above preferred embodiments. It is apparent from the appended claims that such modified or improved embodiments fall within the technical scope of the present invention.

What is claimed is:

1. An apparatus for determining consistency of a database, comprising:
   a reading section that sequentially reads, from respective segment data included in said database, pointers to other segment data;
   an address recording section that records storage addresses of segment data from which the pointers have been read by said reading section;
   a pointer recording section that records the pointers read by said reading section;
   an address modifying section that modifies a storage address recorded in said address recording section when segment data is updated in an area in which the pointer reading has been completed;
   a pointer modifying section that modifies a pointer recorded in said pointer recording section when segment data is updated in an area in which the pointer reading has been completed; and
   a determination section that determines that said database is consistent on condition that the respective storage addresses recorded in said address recording section coincide with the respective pointers recorded in said pointer recording section.

2. The apparatus of claim 1, further comprising:
   a history recording section that has first and second areas for recording pointer values in response to updating segment data in the area in which the pointer reading has been completed, the first area recording a pre-modification value of a pointer included in the segment data, the second area recording a post-modification value of the pointer included in the segment data,
   wherein said pointer modifying section excludes the pointer recorded in the first area of said history recording section from said pointer recording section and adds the pointer recorded in the second area of said history recording section to said pointer recording section.

3. The apparatus of claim 2, further comprising:
   a read address recording section that records an address read by said reading section and sequentially updates the address value in a predetermined order, either ascending or descending, starting from a beginning address from which reading should be started,
   wherein when segment data is updated, said history recording section determines that the segment data is located in an area in which the pointer reading has been completed on condition that a storage address of the segment data is in advance of said read address.

4. The apparatus of claim 2, wherein
   said pointer modifying section adds a pointer recorded in the first area of said history recording section to said pointer recording section in association with a deletion flag indicating that the pointer has been deleted, in order to exclude the pointer from said pointer recording section, and
   said determination section compares each of the pointers recorded in said pointer recording section with each of the addresses recorded in said address recording section, excluding the pointer associated with said deletion flag and one or more pointers having the same value as that pointer.

5. The apparatus of claim 4 wherein
   said pointer modifying section reorders the plurality of pointers recorded in said pointer recording section, along with the added or deleted pointers, in ascending or descending order in accordance with their pointer values, and
   said determination section compares the plurality of reordered pointers with each of the addresses recorded in said address recording section.

6. The apparatus of claim 2, wherein
   in response to adding segment data, said history recording section records pointer absence information, which indicates that no pointer is included, in the first area and a pointer included in the added segment data pointing to another segment data in the second area in association with a storage address of the added segment data,
   in response to deleting segment data, said history recording section records a pointer pointing to another segment data, which the deleted segment data has had before the deletion, in the first area and said pointer absence information in the second area in association with a storage address of the deleted segment data, and
   said address modifying section adds a storage address corresponding to the first area to said address recording section when said pointer absence information is recorded in said first area and excludes a storage address corresponding to said second area from said address recording section when said pointer absence information is recorded in said second area.

7. The apparatus of claim 6, wherein
   said address modifying section records a storage address corresponding to said second area in said address recording section in association with a deletion flag indicating that said storage address has been deleted in order to exclude said storage address from said address recording section when said pointer absence information is recorded in said second area, and
   said determination section compares each of the storage address recorded in said address recording section with each of the pointers recorded in said pointer recording section, excluding the storage address associated with said deletion flag and any other storage address having the same value as that storage address.

8. The apparatus of claim 7, wherein
   said address modifying section reorders the plurality of storage addresses recorded in said address recording section in one of ascending and descending order according to their address values on condition that a storage address has been added to said address recording section, and
   said determination section compares the plurality of reordered address values with each of the pointers recorded in said pointer recording section.

9. The apparatus of claim 2, wherein
   when one segment is split into one or more other segment data, said history recording section records a pointer in said first area, which the split segment data has had before splitting and records said pointer, a split flag indicating that said one segment data has been split, pointers pointing to said other segment data in the second area, in association with a storage address of the split segment data, and said pointer modifying section adds the pointers pointing to said other segment data recorded in said second area to said pointer recording section on condition that said split flag is recorded in said second area.

10. The apparatus of claim 1, wherein on condition that said determination section determines that said database is consistent, said pointer recording section further records, when a segment of the segment data is updated in the consistent state, a pointer modified by that updating, said address recording section further records, when a segment of the segment data is updated in the consistent state, a storage address of the segment data added or deleted by that updating, and said determination section determines that the consistency of said database is preserved on condition that the modified pointers recorded in said pointer recording section after being determined that said database is consistent coincide with the respective storage addresses of the added segment data recorded in said address recording section after being determined that said database is consistent.

11. The apparatus of claim 10, wherein said determination section determines that the consistency of said database is preserved on condition that the respective modified pointers recorded in said pointer recording section after being determined that said database is consistent coincide with the addresses sequentially recorded in said address recording section to determine the consistency of the addresses recorded in said address recording section after determining the consistency.

12. A computer program product comprising a computer readable medium having computer usable program code programmed for determining consistency of a database, the operations of the computer program product comprising:

modifying a storage address recorded in an address recording section in response to updating segment data in an area in which a database pointer reading has been completed, wherein the reading section sequentially reads database pointers to other segment data from respective segment data included in the database pointers;

modifying a pointer recorded in a pointer recording section in response to updating segment data in an area in which the database pointer reading has been completed, wherein the pointer recording section records the database pointers read by the reading section; and determining that the database is consistent on condition that the respective storage addresses recorded in an address recording section coincide with the respective pointers recorded in the pointer recording section, wherein the address recording section records storage addresses of segment data from which the database pointers have been read by the reading section.

13. A system for determining consistency of a database, the system comprising:

a data storage device storing a database; and a data management system in communication with the database of the data storage device, the data management system comprising:

a reading section that sequentially reads, from respective segment data included in the database, pointers to other segment data;

an address recording section that records storage addresses of segment data from which the pointers have been read by the reading section;

a pointer recording section that records the pointers read by the reading section;

an address modifying section that modifies a storage address recorded in the address recording section when segment data is updated in an area in which the pointer reading has been completed;

a pointer modifying section that modifies a pointer recorded in the pointer recording section when segment data is updated in an area in which the pointer reading has been completed; and a determination section that determines that the database is consistent on condition that the respective storage addresses recorded in the address recording section coincide with the respective pointers recorded in the pointer recording section.

* * * * *